May 22, 1945.  L. V. ROBINSON  2,376,814
COMPRESSION INDICATOR
Filed Aug. 27, 1943
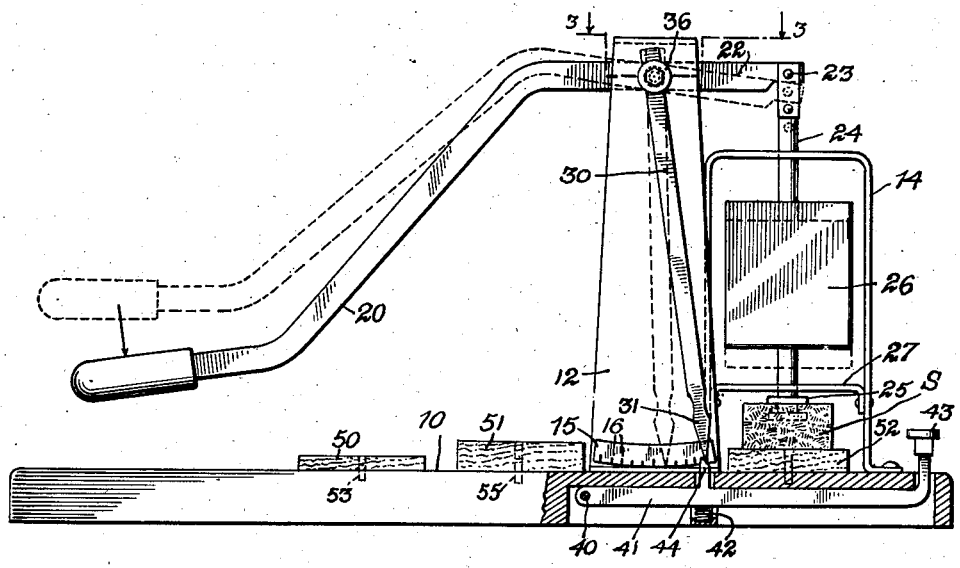
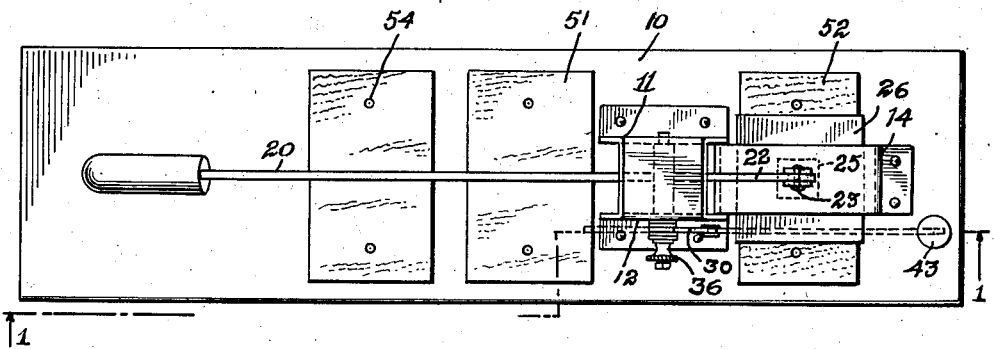
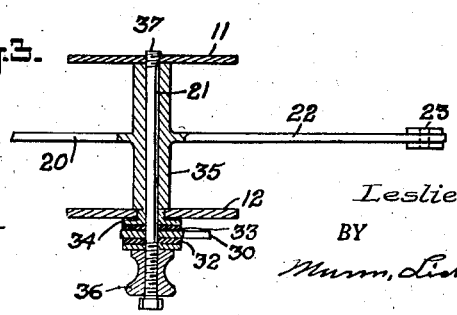
INVENTOR.
Leslie V. Robinson
BY
Attorneys
Witnesses Patented May 22, 1945

2,376,814

UNITED STATES PATENT OFFICE 2,376,814

COMPRESSION INDICATOR

Leslie V. Robinson, New York, N. Y., assignor to Robinson Aviation, Inc., New York, N. Y.

Application August 27, 1943, Serial No. 500,216

7 Claims. (Cl. 73—94)

This invention relates to compression indicators and more particularly to indicators designed to accurately determine the amount of compression caused by applying a definite load per square inch to any material. While my machine may be used in its present form or in any modification thereof for general testing research, it is particularly adapted for the rapid routine testing of soft materials such as sponge rubber, plastic sponge and similar articles. One of the objects of my invention is to provide a testing machine which will be simple in operation but accurate in standardizing the degree of compressibility under a designated load.

In the accompanying drawing

Figure 1 is a side elevation partly in section of a machine employing my improved device.

Fig. 2 is a plan view thereof.

Fig. 3 is a detailed cross sectional view taken on the line 3—3 of Fig. 1.

I provide a base 10 which may be of any convenient size and upon which is mounted the uprights 11 and 12 as well as the U-shaped upright 14. Each of the uprights are affixed to the base in any suitable manner. The base of the upright 12 is provided with a scale 15 having graduations thereon 16 of any desired type. An operating handle 20 is pivoted between the uprights 11 and 12 on the pivot 21 and has arm 22 linked at 23 to the rod 24. Mounted on the lower end of the rod 24 is a pressure plate 25. Likewise mounted on the rod 24 is a weight 26. A reinforcing member 27 connects the sides of the upright 14.

Frictionally mounted on the shaft 21 is an indicator 30 having an indicating hand 31 adapted to register with the graduations 16. The indicator 30 is mounted between washers 32 and 33 which engage the sleeve collar 34 which in turn abuts the hub 35 mounted on the operating handle 20. A knurled nut 36 is adapted to increase or decrease the friction. It will be seen that by loosening or tightening the nut 36, pressure of the washers 32 and 33 and the pressure of the sleeve collar 34 against the hub 35 can be controlled.

It will be noted that the shaft 21 is fixed in the upright 11 by means of the threads 37.

Pivotally mounted at 40 is a lever 41 normally held in an upward position by the spring 42. The lever 41 has a release button 43 and a latch member 44 adapted to engage the indicator hand 31 to hold it to the zero position.

Different size blocks 50, 51 and 52 provided with pins 53 and 54 are provided. The pins 53 hold the blocks in a firm position in the recesses 55 of the base 10. In using the device a block should be used which will place the sample to be tested approximately ⅛ of an inch below pressure plate 25 when the handle 20 is depressed. It will be appreciated that one or more of the blocks may be used to position the sample.

In using the device the indicator hand 31 is secured by the latch 44. The handle 20 is then depressed as far as it will go and the sample to be tested "S" is slid under the pressure plate 25. The handle is then raised until the pressure plate just touches the sample. This can be ascertained by moving the sample slightly until friction is felt. At this point the release button 43 is depressed to free the indicator hand 31 and the handle is released to allow weight 26 to carry the pressure plate 25 against the sample. The indicator hand 31 will then indicate on the scale 15 the degree of the deflection. The handle is then depressed and the release button 43 freed so that the indicator hand 31 will be caught by the latch. The sample is removed and another one inserted for test.

It will be appreciated that any measure may be applied to scale 15, that it is desirable for the particular uses to which my device is to be put, and that the pressure plate 25 may be of any desired size. By way of example the pressure plate may be made a square inch in area, the weight ten pounds and the graduation one-hundredth of an inch. In operation the device will then show on the scale the deflection in hundredths of an inch caused by an applied load of ten pounds per square inch. Quite obviously the weight area or graduations may be varied to suit the particular use to which the device is to be applied.

I claim:

1. A compression indicator including a base, a pair of uprights, a horizontal pivot on said uprights, a handle member, the pivot being keyed to said handle member for unitary rocking movement therewith, a pressure plate, a weight controlling said pressure plate, said weight being connected to said handle, and indicating means frictionally mounted on said pivot.

2. A compression indicator including a base, a pair of uprights, a horizontal pivot on said uprights, a handle member, the pivot being keyed to said handle member for unitary rocking movement therewith, a pressure plate, a weight controlling said pressure plate, said weight being connected to said handle, and indicating means frictionally mounted on said pivot, said indicating means being normally held inactive, and means for releasing said indicating means.

3. A compression indicator including means for suspending a weighted plate above the material to be tested, said suspension means including a horizontal pivot and a handle member, the pivot being keyed to said handle member for unitary rocking movement therewith, a deflection indicator frictionally mounted on said pivot, means for releasably holding said deflection indicator in an inactive position, and means for releasing said deflection indicator to determine the amount of movement of said weighted plate.

4. A compression indicator including a base, a pair of upright members on said base, a horizontal pivot on said uprights, a handle member, the pivot being keyed to said handle member for unitary rocking movement therewith, a pressure plate suspended from said handle member, an indicating hand frictionally mounted on said pivot, means for holding said indicating hand inactive until said pressure plate is in a predetermined position, and means for releasing said indicating hand to show the further movement of said pressure plate.

5. A device for determining the amount of compression in material to be tested which includes a base for said material, a weighted plate adapted to be suspended over said material and moved into contact therewith, said weighted plate being suspended from a handle member which is keyed to a horizontal pivot for unitary rocking movement therewith, an indicating hand frictionally mounted on said pivot, means for holding said indicating hand inactive until said plate reaches a predetermined position, and means for releasing said indicating hand so that it may show further movement of said plate.

6. A device for determining the amount of compression caused by applying a definite load to a predetermined area on material to be tested, including a pressure plate of a desired area, a weight activating said plate, means for suspending said plate above the material to be tested, including a handle member and a horizontal pivot, said pivot being keyed to said handle member for unitary rocking movement therewith, an indicator frictionally mounted on said pivot, means for maintaining said indicator inactive until said pressure plate engages said material, additional means for releasing said indicator and said pressure plate to show the compression in the material caused thereby.

7. A device for determining the compression caused in material by the application of a predetermined weight over a predetermined area, including a base, means on said base supporting a weighted plate, said means including a handle member and a horizontal pivot, said pivot being keyed to said handle member for unitary rocking movement therewith, said handle member controlling the position of said weighted plate, an indicating hand frictionally mounted on said pivot, a latch member adapted to hold said indicating hand inactive until said plate engages the material to be tested, means for releasing said indicating hand to show the compression caused in said material.

LESLIE V. ROBINSON.